United States Patent Office 2,931,809
Patented Apr. 5, 1960

2,931,809

ANTIBACTERIAL AZOMETHINE DERIVATIVES OF 5-CYANO-2-THIOPHENE OR 4-CYANOBENZENE

Alberto Vecchi and Gaetano Melone, Milan, Italy, assignors to Lepetit S.p.A., Milan, Italy No Drawing. Application September 13, 1957
Serial No. 683,718

Claims priority, application Italy September 14, 1956

7 Claims. (Cl. 260—240)

The present invention relates to new antibacterial compounds. More particularly the compounds with which the invention is concerned correspond to the following general formula:

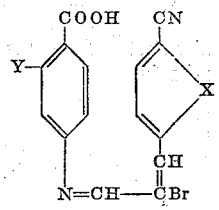

wherein Y represents hydrogen or hydroxyl and X represents a sulfur atom or a vinylene group —CH=CH—.

The compounds of this invention have been found particularly useful against a series of gram-positive and gram-negative bacteria. As they are only slightly soluble in water and in other solvents they have been tested also in the form of their salts with aliphatic amines. The salts which have been found particularly useful are the mono-, di- and trihydroxyethylamine salts.

The following table gives the antibacterial activity in γ/ml. of some representative compounds of the invention.

The method for preparing the compounds of this invention comprises two main steps. The first step consists in the preparation of a β-substituted-α-bromoacrolein of the formula:

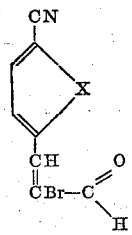

This β-substituted-α-bromoacrolein is prepared starting from an aldehyde of the formula:

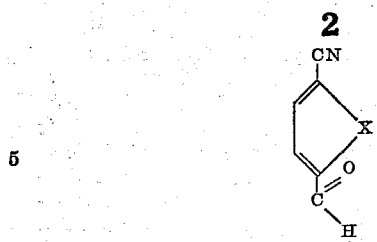

wherein X is S or —CH=CH—; thus the aldehyde is either 4-cyanobenzaldehyde or 5-cyano-2-thiophenecarboxaldehyde. 4-cyanobenzaldehyde is already known in chemical literature, while 5-cyano-2-thiophenecarboxaldehyde has been prepared by us from 2-methyl-5-iodothiophene, which with cuprous cyanide in alkaline medium is transformed into 2-methyl-5-cyanothiophene and this latter, by oxidation, into 5-cyano-2-thiophenecarboxaldehyde as described in one of the examples of the present application.

Cyanobenzaldehyde or cyanothiophenecarboxaldehyde are then refluxed with acetaldehyde in the presence of acetic anhydride for about one hour; by cooling the condensation product precipitates, i.e. 4-cyanocinnamaldehyde or β-(5-cyano-2-thienyl)-acrolein.

The α-bromination of these compounds is carried out under particular conditions. By treatment with one mole bromine saturation of the double bond occurs with formation of a α,β-dibromoderivative, this latter is treated with potassium carbonate without isolating it from the reaction medium, whereby the desired α-bromoacrolein is obtained.

In order to obtain the compounds of the invention one mole of the obtained α-bromoacrolein dissolved in a hot lower aliphatic alcohol, is added to one mole of p-aminobenzoic or p-aminosalicylic acid; after few minutes the azomethine precipitates and is collected and dried. The compounds of the invention are then salified, if desired, with a tertiary aminic base according to conventional processes.

| X= | Y= | M. aureus | Str. faecalis | E. coli | Pr. vulgaris | Ps. aeruginosa | Kl. pneumoniae | H37Rv | Trichophyton mentagrophytes | Candida albicans |
|---|---|---|---|---|---|---|---|---|---|---|
| 1 | S | H | 10 | 100 | 50 | 5 | 20 | 20 | 5 | 0.5 | 5 |
| 2 | S | OH | 10 | 50 | 100 | 5 | 20 | 20 | 5 | 0.5 | 10 |
| 3 | CH=CH | H | 10 | 10 | 10 | 5 | 50 | 10 | 10 | 0.2 | 10 |
| 4 | CH=CH | OH | 10 | 50 | 10 | 10 | 20 | 20 | 10 | 1 | 10 |
| 5 | S (hydroxyethylamine salt) | H | 10 | 100 | 50 | 10 | 20 | 20 | 5 | 0.5 | 5 |
| 6 | CH=CH (hydroxyethylamine salt) | H | 10 | 10 | 20 | 5 | 100 | 20 | 20 | 0.5 | 50 |

The invention is clearly illustrated by the following examples which are not intended to limit the same.

EXAMPLE 1

4-[β-bromo-γ-(5-cyano - 2 - thienyl)-acrylideneamino]-benzoic acid

A mixture of 20 g. 5-iodo-2-methylthiophene, 190 ml. anhydrous pyridine and 14.3 g. cuprous cyanide is refluxed for 8 hours. Then the pyridine is distilled in vacuo, the residue is extracted with ethyl acetate, the extract is dried and, after evaporating the solvent vacuo the residue is fractionated, collecting the distillate at 87° C. under 1 mm. Yield 8.5 g. (77%) of 5-cyano-2-methylthiophene: $n_D^{20}$ 1.565.

To a mixture of 13.5 g. 5-cyano-2-methylthiophene, 171 ml. glacial acetic acid and 169.5 ml. acetic anhydride, 25.5 ml. concentrated sulfuric acid are slowly added without exceeding 25° C., and then, in portions, at a temperature between 5 and 10° C., 30 g. of chromic anhydride are added. The mass is shaken for some minutes, then it is poured into about two times its volume of ground ice. The precipitate of a pale yellow color is collected in vacuo and dried. Yield 18 g. (69%) of 5-cyano-2-thiophenecarboxaldehyde diacetate, M.P. 77–78° C.

Ten and five tenths milliliters concentrated sulfuric acid are quickly added to a mixture of 140 ml. 95% ethyl alcohol, 140 ml. water and 35 g. 5-cyano-2-thiophenecarboxaldehyde diacetate, then the mixture is refluxed until complete solution occurs (about 20 minutes). On cooling, 5-cyano-2-thiophenecarboxaldehyde precipitates and is collected in vacuo, washed with water and dried. Yield 18 g. (90%), M.P. 93–94° C.

A mixture of 34.2 g. 5-cyano-2-thiophenecarboxaldehyde and 100 ml. acetaldehyde is cooled to 6–8° C., and at this temperature 5 ml. of 25% potassium hydroxide in anhydrous methanol are added. After having added 100 ml. acetic anhydride the mixture is refluxed for one hour and cooled, a solution of 35 ml. concentrated hydrochloric acid in 300 ml. of water is added, the mixture is refluxed for 30 minutes and cooled. The precipitate is washed with water and recrystallized from water. Yield 27 g. (66%) of β-(5-cyano-2-thienyl)-acrolein, M.P. 128–129° C.

To a solution of 94 g. β-(5-cyano-2-thienyl)-acrolein in 720 ml. glacial acetic acid, held at a temperature between 33 and 35° C., 32 ml. of bromide are slowly added. To the obtained solution 40 g. potassium carbonate are slowly added. At the end of the addition the mixture is refluxed for 30 minutes. On cooling α-bromo-β-(5-cyano-2-thienyl)-acrolein precipitates and is collected in vacuo and recrystallized from 95% ethyl alcohol. Yield 116 g. (83%), M.P. 153–155° C.

A solution of 100 g. α-bromo-β-(5-cyano-2-thienyl)-acrolein in 230 ml. hot absolute ethanol is treated with 60 ml. p-aminobenzoic acid. After a few minutes p-[β-bromo-γ-(5-cyano-2-thienyl)-acrylideneamino] - benzoic acid precipitates, which is collected in vacuo and dried. Yield 133 g. (98%), M.P. 298° C.

A suspension of 85 g. p-[β - bromo - γ - (5-cyano-2-thienyl)-acrylideneamino]-benzoic acid in 700 ml. anhydrous ethanol is mixed with 15 ml. β-hydroxyethylamine. The appearance of the crystals becomes slightly different. The mixture is stirred for one hour, then the light yellow crystals are collected in vacuo and dried. Yield 95 g. (95%) β-hydroxyethylamine p-[β-bromo-γ-(5-cyano - 2 - thienyl)acrylideneamino] - benzoate, M.P. 173–175° C. (dec.).

EXAMPLE 2

4-(4-cyano-β-bromo-cinnamylideneamino)-benzoic acid

To a solution of 32.7 g. 4-cyanobenzaldehyde in 100 ml. acetaldehyde, previously cooled to 6–7° C., 5 ml. of a 25% potassium hydroxide solution in anhydrous methanol are slowly added. One hundred milliliters acetic anhydride are added and the mixture is refluxed for 30 minutes. On cooling, crystals with some resin precipitate. They are filtered and recrystallized from 1% acetic acid. Yield 27 g. (69%) of 4-cyanocinnamaldehyde, M.P. 135–137° C. To a solution of 30 g. 4-cyanocinnamaldehyde in 240 ml. glacial acetic acid, previously heated to 35° C., 10.5 g. of bromine are added dropwise. At the end of the addition 13.2 anhydrous potassium carbonate are added and the mixture is refluxed for 30 minutes. After cooling the crystals are collected in vacuo and recrystallized from anhydrous ethanol. Yield 42 g. (94%) of 4-cyano-α-bromocinnamaldehyde, M.P. 156–157° C.

A mixture of 10 g. 4-cyano-α-bromocinnamaldehyde and 20 ml. anhydrous ethanol is heated to boiling until a complete solution results. To the hot solution 5.8 g. p-aminobenzoic acid are added and the mixture is refluxed. At first a complete solution is obtained, then crystals precipitate which are collected in vacuo after cooling and dried. Yield 12 g. (80%) of 4-(4-cyano-β-bromocinnamylideneamino)-benzoic acid, M.P. 194° C.

A suspension of 5 g. 4-(4-cyano-β-bromocinnamylideneamino)-benzoic acid in 100 ml. anhydrous ethanol is treated with 0.86 g. β-hydroxyethylamine. A modification of the appearance of the crystals is observed. The mixture is cooled, the solids collected in vacuo and dried. Yield 5 g. (86%) of β-hydroxyethylamine 4-(4-cyano-β-bromocinnamylideneamino) - benzoate, M.P. 152–155° C. (dec.).

EXAMPLE 3

4-(4-cyano-β-bromocinnamylideneamino)-salicylic acid

A boiling solution of 10 g. 4-cyano-α-bromocinnamaldehyde in 200 ml. anhydrous ethanol is treated with 6.5 4-aminosalicylic acid. The mixture is quickly stirred in order to bring at once the acid in solution, then 2.5 ml. of concentrated hydrochloric acid are added. A precipitation of thinnest crystals is obtained immediately. The mixture is cooled, the solids collected in vacuo and dried. Yield 12 g. (92%) 4-(4-cyano-β-bromo-cinnamylideneamino)-salicylic acid, M.P. 228–230° C.

We claim:

1. A compound selected from the class consisting of an azomethine of the formula

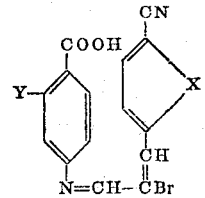

wherein X is a member of the class consisting of sulfur and vinylene, and Y is a member of the class consisting of hydrogen and hydroxyl, and its mono-, di-, and trihydroxy ethylamine addition salts.

2. A compound selected from the class consisting of an azomethine of the formula

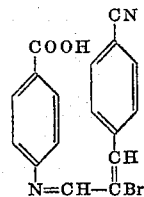

and its mono-, di-, and tri-hydroxy ethylamine addition salts.

3. A compound selected from the class consisting of an azomethine of the formula

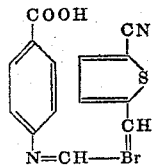

and its mono-, di-, and tri-hydroxy ethylamine addition salts.

4. 4-[β-bromo-γ-(5-cyano-2-thienyl)-acrylideneamino]-benzoic acid.

5. 4-(4-cyano-β-bromocinnamylideneamino) - benzoic acid.

6. 4-[β-bromo-γ-(5-cyano-2-thienyl)-acrylideneamino]-salicylic acid.

7. 4-(4-cyano-β-bromocinnamylideneamino) - salicylic acid.

References Cited in the file of this patent

FOREIGN PATENTS 759,378    Great Britain _____ Oct. 17, 1956

OTHER REFERENCES

Rao: Journal of the Indian Chemical Society, vol. 26, pp. 133-6 (1949).

Mohlau et al.: Zeitschrift für Farben Industrie, vol. 5, pp 404–409 (1906).

Frear: Journal of Economic Entomology, vol. 40, No. 5, pp. 736–741 (1947).